US009248871B1

(12) United States Patent
Waskie et al.

(10) Patent No.: US 9,248,871 B1

(45) Date of Patent: Feb. 2, 2016

(54) MULTI-POSITION ENDGATE SYSTEM

(71) Applicant: GM GLOBAL TECHNOLOGY OPERATIONS LLC, Detroit, MI (US)

(72) Inventors: David B. Waskie, Shelby Township, MI (US); Derek L. Patterson, Shelby Township, MI (US); Daniel R. Hunt, Troy, MI (US); Roland Dibra, Dearborn, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 14/601,310

(22) Filed: Jan. 21, 2015

(51) Int. Cl.

*B62D 33/00* (2006.01)
*B62D 33/027* (2006.01)
*B62D 33/03* (2006.01)
*E05C 17/02* (2006.01)

(52) U.S. Cl.

CPC ............ *B62D 33/0273* (2013.01); *B62D 33/03* (2013.01); *E05C 17/02* (2013.01)

(58) Field of Classification Search

CPC ..... B62D 33/0273; B62D 33/03; E05C 17/02
USPC ............................................ 296/57.1, 50, 61
See application file for complete search history.

(56) References Cited

U.S. PATENT DOCUMENTS

| | | | | |
|---|---|---|---|---|
| 5,645,310 A * | 7/1997 | McLaughlin | B62D 35/001 296/180.5 |
| 6,450,559 B1 | 9/2002 | Renke | |
| 6,857,678 B2 * | 2/2005 | Lisk, III | B60P 1/26 292/338 |
| 2003/0116991 A1 * | 6/2003 | Katulka | B62D 33/0273 296/57.1 |

* cited by examiner

*Primary Examiner* — Joseph D Pape

(74) *Attorney, Agent, or Firm* — Quinn Law Group, PLLC

(57) ABSTRACT

A multi-position endgate system includes a storage box wall and a storage box floor. A tailgate is mounted relative to the storage box floor and is pivotal about a tailgate axis. The tailgate is moveable between a fully-closed position proximal to the storage box wall and a fully-open position distal from the storage box wall. A cable mechanism has a first end pivotally attached to the tailgate and a second end pivotally attached to the storage box wall. A channel hook is attached to either the tailgate or the storage box wall at a connector. An arcuate ledge is spaced from the connector, by an arm, and defines a groove. The cable mechanism may be passed or routed through the groove of the arcuate ledge to selectively hold the tailgate in an intermediate position between the fully-closed and fully-open positions.

14 Claims, 4 Drawing Sheets

MULTI-POSITION ENDGATE SYSTEM

TECHNICAL FIELD

This disclosure relates to doors and openings for cargo compartments, such as endgates or tailgates.

BACKGROUND

Vehicles with cargo compartments may use endgates or tailgates to allow access to an end or side of the cargo compartment. Endgates may be hinged closures or doors that are often found at the rear of the vehicle and can be lowered during loading and unloading.

SUMMARY

A multi-position endgate system, such as usable for the cargo compartment of vehicle, is provided. The endgate system includes at least one storage box wall and a storage box floor. The walls and floor generally define a cargo or storage volume.

An endgate or tailgate is mounted relative to the storage box floor and is pivotal about a tailgate axis. The tailgate is moveable between a fully-closed position proximal to the storage box wall and a fully-open position distal from the storage box wall.

A cable mechanism has a first end pivotally attached to the tailgate and a second end pivotally attached to the storage box wall. The cable mechanism limits travel of the tailgate beyond the fully-open position.

The endgate system includes a channel hook, which is attached or connected to either the tailgate or the storage box wall at a connector. An arcuate ledge is spaced from the connector and defines a groove. An arm joins the arcuate ledge to the connector. The cable mechanism may be passed or routed through the groove of the arcuate ledge to selectively hold the tailgate in an intermediate position, which holds the tailgate between the fully-closed and fully-open positions.

The above features and advantages, and other features and advantages, of the present disclosure are readily apparent from the following detailed description of some of the best modes and other embodiments for carrying out the disclosure, which is defined solely by the appended claims, when taken in connection with the accompanying drawings.

DETAILED DESCRIPTION

Figure 1:
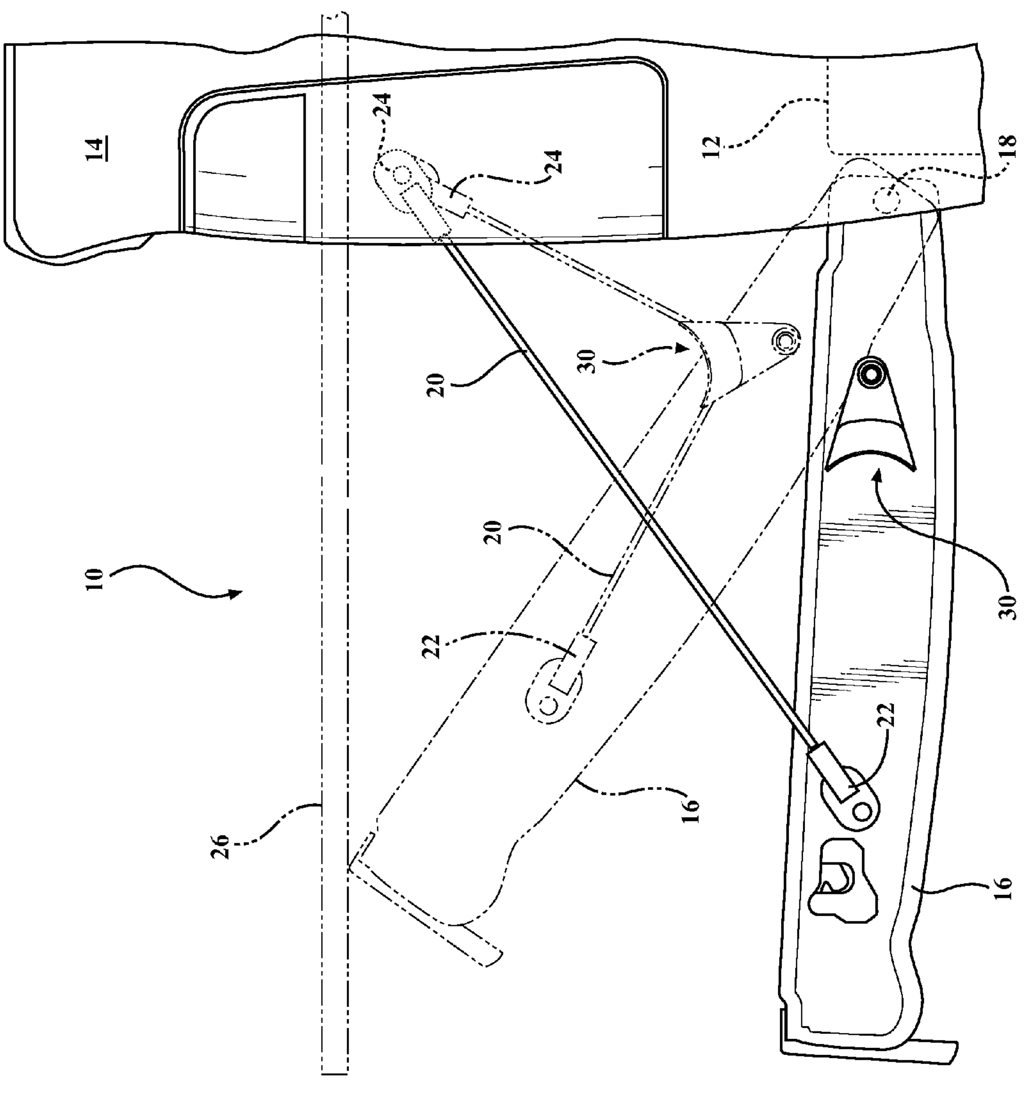
FIG. 1 is a schematic, right-hand side view of an endgate system with a tailgate illustrated in a fully open position, in solid lines, and in an intermediate, or partially-deployed position, in phantom.

Referring to the drawings, like reference numbers correspond to like or similar components wherever possible throughout the several figures. FIG. 1 shows a schematic side or plan view of a multi-position endgate system 10 for a vehicle (not numbered), generally from the right-hand side of the vehicle.

In the endgate system 10, a storage box floor 12, which may be referred to as the floor 12, and one or more storage box walls 14, which are generally perpendicular to the floor 12, partially define a cargo area, storage volume, or cargo box of a vehicle (the remainder of which is not shown). An endgate or tailgate 16 is pivotally mounted relative to the floor 12 and the walls 14.

The specific structure to which the tailgate 16 is attached may vary depending upon the configuration and type of vehicle—some may attach the tailgate 16 to the walls 14 and some to the floor 12—such that the tailgate 16 may be referred to as being attached to the cargo box in general. The tailgate 16 generally pivots about a pair of attachment points or an endgate axis 18. In some configurations, the tailgate 16 may move by translating or oscillating about complex axes or linkages. The walls 14, the floor 12, and the tailgate 16 generally define much of the storage volume. There may or may not be an upper barrier, such as a topper or cover.

The endgate system 10 is shown with the tailgate 16 in a fully-open or fully-deployed position in solid lines, and an intermediate or partially-deployed position in phantom lines. When the tailgate 16 is fully open, it may be substantially horizontal relative to the floor 12 (and, likely, the ground), and provides substantially-uninhibited access to the cargo box. In a fully-closed position, which would be hidden from view by the wall 14, the tailgate 16 is substantially vertical and abuts the wall 14 to close off or limit access to the cargo box of the vehicle.

While the present disclosure may be illustrated with respect to particular industries or applications, those skilled in the art will recognize the broader applicability of the products and methods described herein. For example, similar structures, methods, or combinations thereof, may be used in other industries, including, without limitation: household items, electronic devices, farm or industrial equipment, and building materials.

Those having ordinary skill in the art will recognize that terms such as "above," "below," "upward," "downward," et cetera, are used descriptively of the figures, and do not represent limitations on the scope of the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Any specific configurations shown in the figures are illustrative only and the specific configurations shown are not limiting of the claims or the description.

The vehicle (partially shown) upon which the endgate system 10 is mounted may be, for example and without limitation: a pickup truck, a wagon, a cross-over, or a sport-utility vehicle (SUV). When used on wagons, cross-over vehicles, or sport utility vehicles, the tailgate 16 may cooperate with a door, hatch, or other structure that opens upward.

A cable mechanism 20 spans between the tailgate 16 and the wall 14. The cable mechanism 20 has a first end 22 pivotally attached to the tailgate 16 and a second end 24 pivotally attached to the wall 14. Note that the second end 24 of the cable mechanism 20 is hidden from view by the right-hand side wall 14 in FIG. 1. In many configurations, the left and right side of the endgate system 10 will each have cable mechanism 20. The cable mechanism 20 is pivotally attached to the wall 14 by bosses extending from, or bolts attached to, the wall 14. These attachment points may also act as a striker, which may also serve to lock the tailgate 16 to the wall 14 when closed.

A platform 26, which is shown in phantom, may cooperate with the tailgate 16 in the intermediate position and with rail supports formed on, or attached to, the walls 14 to provide a stable surface for use as a table or cargo support. The platform 26 can also form a level surface for loading sheet cargo such as plywood or drywall, and may be formed from, for example, a plywood board or metal sheet.

Figure 2:
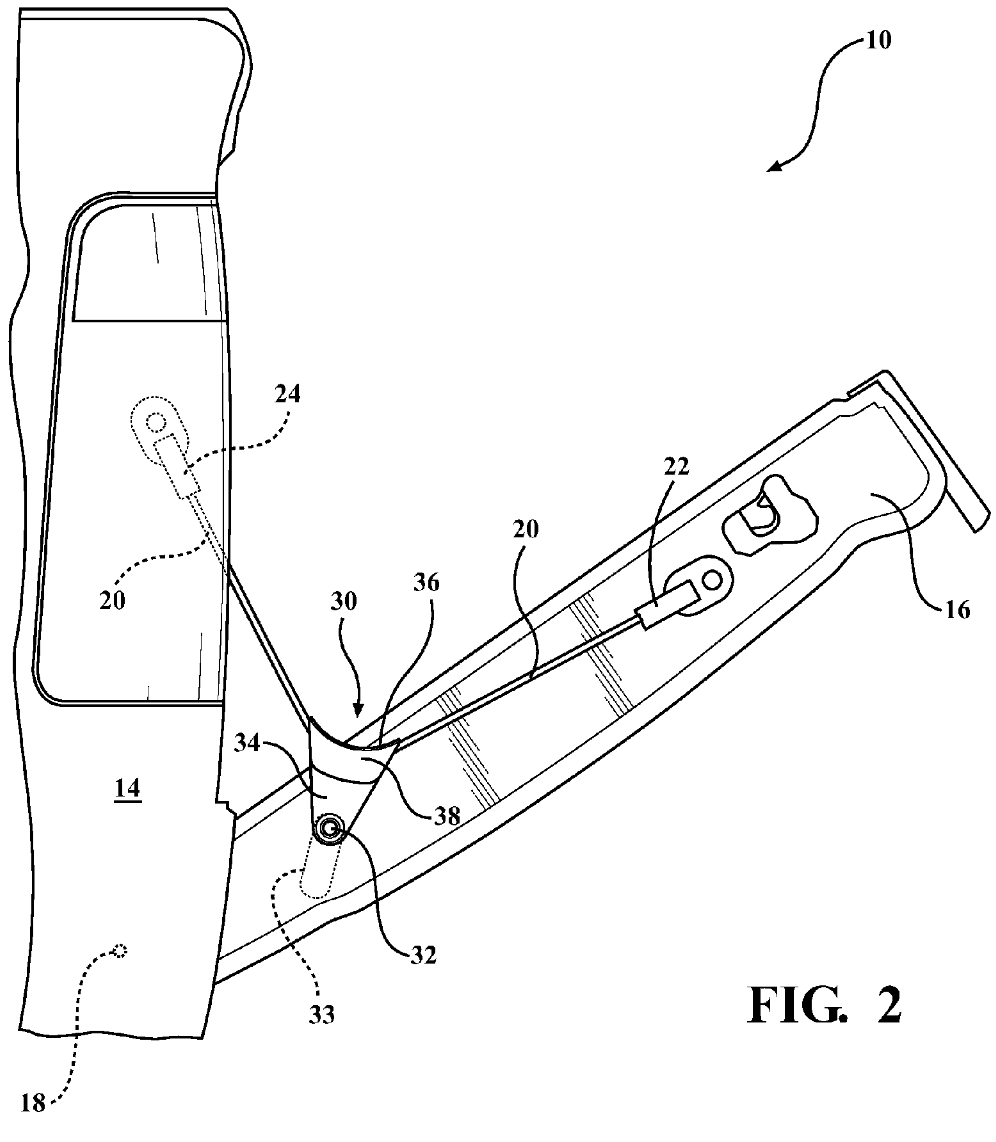
FIG. 2 is a schematic, left-hand side view of the endgate system, showing a cable mechanism cooperating with a channel hook to place the tailgate into the intermediate position.

Referring also to FIG. 2, and with continued reference to FIG. 1, there is shown an additional view of portions of the endgate system 10. As illustrated in FIGS. 1 and 2, the cable mechanism 20 cooperates with a channel hook 30 to place the tailgate 16 into the intermediate position.

The channel hook 30 varies the effective length of the cable mechanism 20 between the walls 14 and the tailgate 16. As illustrated in FIG. 2, the intermediate position of the tailgate 16 is approximately 53-degrees. However, depending on the configuration, the intermediate position may be at other angles between the fully-closed and fully-open positions.

Figure 3:
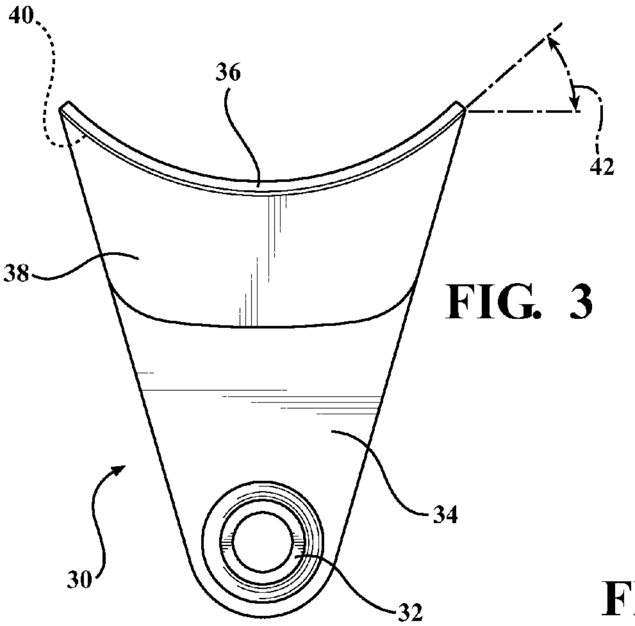
FIG. 3 is a schematic, front view of the channel hook.
Figure 4:
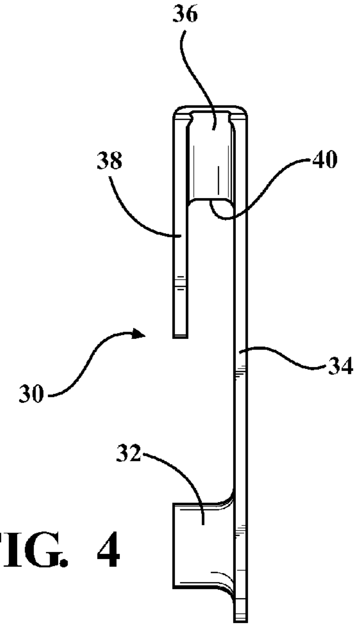
FIG. 4 is a schematic, side view of the channel hook illustrating a groove in which the cable mechanism selectively sits.

Referring also to FIG. 3 and FIG. 4, and with continued reference to FIGS. 1-2, there are shown isolated views of the channel hook 30. FIG. 3 shows a plan or front view of the channel hook 30 and FIG. 4 shows a side view of the channel hook 30.

The channel hook 30 includes a connection point or connector 32 that may be attached to either the tailgate 16, between the first end 22 of the cable mechanism 20 and the endgate axis 18, or to the wall 14, the second end 24 of the cable mechanism 20 and the endgate axis 18. In FIGS. 1 and 2, the connector 32 is attached to the tailgate 16. However, the channel hook 30 functions substantially the same if attached to the wall 14.

An arm 34 extends away from the connector 32. The arm 34 joins the connector 32 to an arcuate ledge 36, which is spaced from the connector 32. The arcuate ledge 36 bows away from the connector 32, such that its center is closer to the connector 32 than its ends.

The arcuate ledge 36 defines a groove 40. The cable mechanism 20 may be manually passed or routed through the groove 40 of the arcuate ledge 36. When the cable mechanism 20 is within the groove 40, the channel hook 30 is selectively holding the tailgate 16 in the intermediate position between the fully-closed position and the fully-open position. A flange 38 extends from the arcuate ledge 36 opposite the arm 34, such that the flange 38 and the arm 34 may further define or extend the groove 40 in which the cable mechanism 20 sits.

In the configuration shown, the channel hook 30 is rotatably attached, such that the arcuate ledge 36 rotates about the connector 32. Rotation allows the channel hook 30 to pivot the arcuate ledge 36 toward the cable mechanism 20 and may allow the cable mechanism 20 to better settle within the groove 40. Additionally, the channel hook 30 may pivot out of the way to stow next to the tailgate 16 when not in use. However, in other configurations, the channel hook 30 may be movable within a translation slot 33, shown in phantom, such that it extends toward the cable mechanism 20 when in use and then recesses when not in use. The channel hook 30 may also be removable for stowage apart from the endgate system 10, when the channel hook 30 is not in use.

The ends of the arcuate ledge 36 define exit angles 42 for the cable mechanism 20 passing through the groove 40. The exit angles 42 are at least tangent with the cable mechanism 20. Therefore, the exit angles 42 may be greater than tangent, which would be larger than the angle shown in FIG. 3, such as by curling further from the cable mechanism 20. If the exit angles 42 are lesser than tangent, there may be a pinch point or edge between the cable mechanism 20 and the ends of the arcuate ledge 36, which may cause wear or fraying of the cable mechanism 20.

Figure 5:
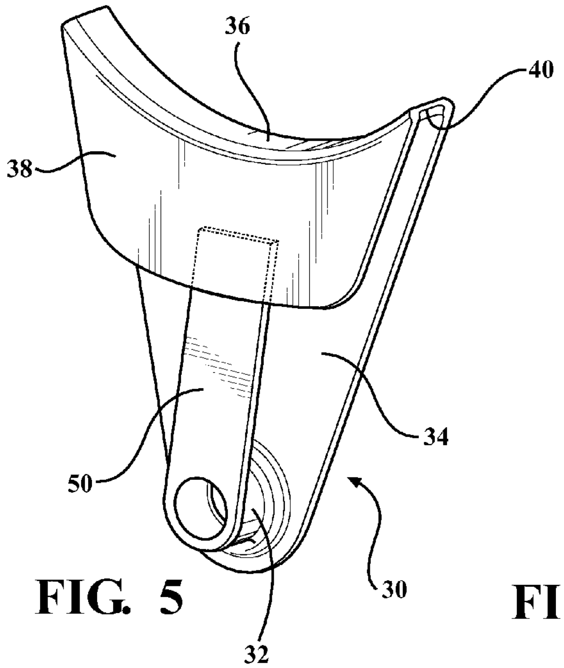
FIG. 5 is a schematic, isometric view of the channel hook having a cantilevered clip that limits removal of the cable mechanism.
Figure 6:
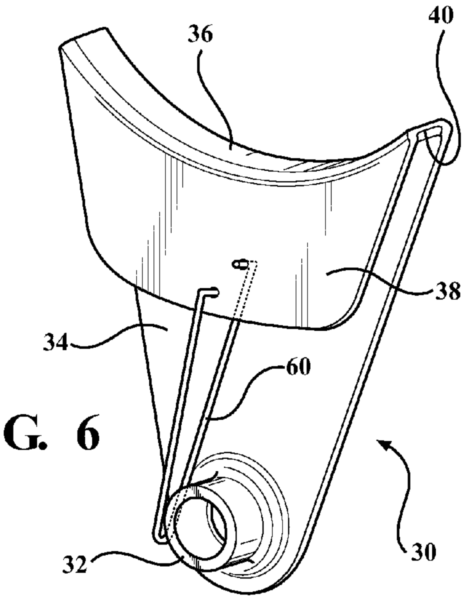
FIG. 6 is a schematic, isometric view of the channel hook having a wire-style clip that limits removal of the cable mechanism.

Referring also to FIG. 5 and FIG. 6, and with continued reference to FIGS. 1-4, there are shown additional views or configurations of the channel hook 30. In FIG. 5 the channel hook 30 has a cantilevered clip 50, and in FIG. 6 the channel hook 30 has a wire-style clip 60, both of which may limit removal of the cable mechanism 20 from the groove 40.

The cantilevered clip 50 selectively, or removably, restrains transfer of the cable mechanism 20 to and from the groove 40 of the channel hook 30. The cantilevered clip 50 may be formed from, for example, spring steel and extends from the connector 32 to the flange 38. In order to move the cable mechanism 20 to or from the groove 40, the cantilevered clip 50 is depressed to create a gap between the flange 38 and the cantilevered clip 50.

The spring clip or wire-style clip 60 is attached to the flange 38 at offset points, which create a spring force biasing the wire-style clip 60 into the connector 32. Flexing the wire-style clip 60 away from the connector 32 creates a gap or passageway for movement of the cable mechanism 20 into, or out of, the groove 40. Note that alternative clip styles, in addition to the cantilevered clip 50 and the wire-style clip 60 may be used to lock the cable mechanism 20 into the groove 40.

Figure 8:
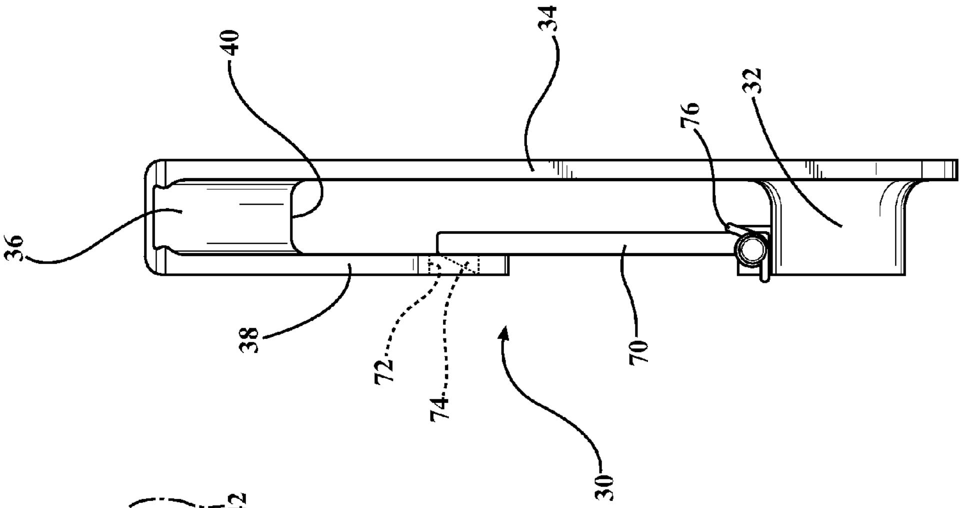
FIG. 8 is a schematic, side view of the channel hook configured with the carabiner clip shown in FIG. 7.
Figure 7:
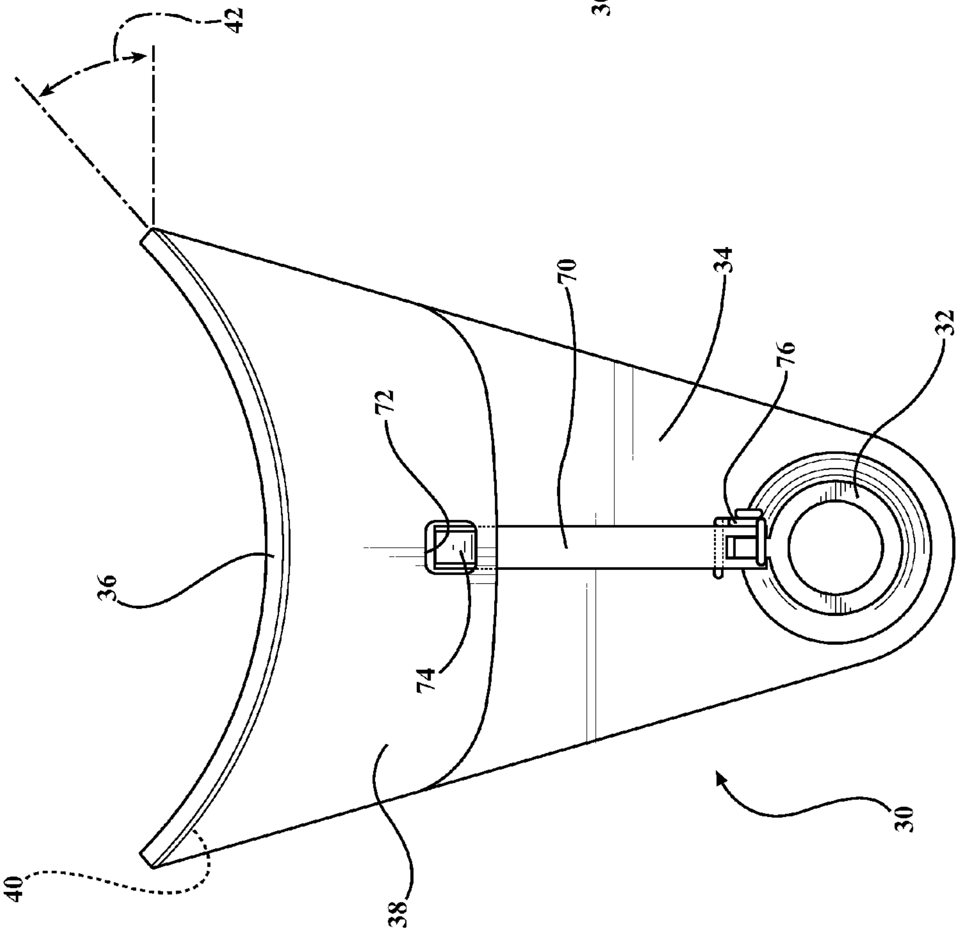
FIG. 7 is a schematic, front view of the channel hook configured with a carabiner clip that forms a closed section or closed loop around the groove of the channel hook.

Referring also to FIG. 7 and FIG. 8, and with continued reference to FIGS. 1-6, there are shown additional views or configurations of the channel hook 30. FIG. 7 shows a front view and FIG. 8 shows a side view of the channel hook 30 having a carabiner clip 70. The carabiner clip 70 limits removal of the cable mechanism 20 from the groove 40.

As shown in FIGS. 7 and 8, the carabiner clip 70 pivots about a point or axis adjacent the connector 32. In an open position, with the carabiner clip 70 rotated clockwise (as viewed in FIG. 8) from the position shown, the carabiner clip 70 allows access to and from the groove 40. In the closed position, as shown in FIG. 8, the carabiner clip 70 forms a closed section around the groove 40 and blocks movement of the cable mechanism 20 to and from the groove 40.

The carabiner clip 70 cooperates with a clip window 72 formed in the flange 38 to form a closed section, which directly transfers loads between the flange 38 and the connector 32. Contrarily, in the cantilevered clip 50 and the wire-style clip 60 shown in FIGS. 5 and 6, all loading transferred between the arcuate ledge 36 and the connector 32 passes through the arm 34.

A protrusion 74 extends from the carabiner clip 70 into the clip window 72. Alternatively, the flange 38 could have a boss or hook that cooperates with the upper portion of the carabiner clip 70. The closed section (or closed loop) formed between the arcuate ledge 36 and the connector 32 may improve the overall strength of the channel hook 30 when cooperating with the cable mechanism 20 to hold the tailgate 16 in the intermediate position.

In the configuration shown, a biasing mechanism 76 is configured to bias the carabiner clip 70 counterclockwise (as viewed in FIG. 8) toward the flange 38, such that the carabiner clip 70 tends toward closing the groove 40. Alternatively, an internal leaf spring or other mechanism may bias the carabiner clip 70 closed, or a latch or lock may be configured to selectively prevent the carabiner clip 70 from moving away from the flange 38.

Alternatively, although not shown, a carabiner-style clip may rotate about an axis parallel to the connector 32, such that the clip stays substantially equidistant from the arm 34. The clip may then lock or hook to the flange 38. For example, the wire-style clip 50 could be reversed such that it attaches to the connector 32 and interfaces with a hook formed on the side of the flange 38. In such a configuration, the clip and the flange 38 cooperate to form a closed section or loop.

The detailed description and the drawings or figures are supportive and descriptive of the disclosure. While some of the best modes and other embodiments for carrying out the disclosure have been described in detail, various alternative designs, configurations, and embodiments exist for practicing the appended claims.

The invention claimed is:

1. A multi-position endgate system, comprising:

a storage box wall;

a storage box floor;

a tailgate mounted relative to the storage box floor and pivotal about a tailgate axis between a fully-closed position proximal to the storage box wall and a fully-open position distal from the storage box wall;

a cable mechanism having a first end pivotally attached to the tailgate and a second end pivotally attached to the storage box wall; and a channel hook having:

a connector attached to one of the tailgate and the storage box wall;

an arcuate ledge spaced from the connector and defining a groove; and an arm joining the arcuate ledge to the connector, wherein the cable mechanism is configured to be passed through the groove of the arcuate ledge to selectively hold the tailgate in an intermediate position between the fully-closed position and the fully-open position.

2. The endgate system of claim 1, wherein the connector of the channel hook is attached between one of:

the first end of the cable mechanism and the tailgate axis, and the second end of the cable mechanism and the tailgate axis.

3. The endgate system of claim 2, wherein the channel hook further includes:

a flange extending from the arcuate ledge opposite the arm.

4. The endgate system of claim 3, wherein the channel hook further includes:

a clip disposed to selectively block removal of the cable mechanism from the groove.

5. The endgate system of claim 4, wherein the channel hook is attached to the tailgate.

6. The endgate system of claim 5, wherein the channel hook is rotatably attached, such that the arcuate ledge rotates about the connector.

7. The endgate system of claim 6, wherein exit angles of the arcuate ledge are at least tangent with the cable mechanism passing through the groove defined by the arcuate ledge.

8. The endgate system of claim 1, wherein exit angles of the arcuate ledge are at least tangent with the cable mechanism passing through the groove defined by the arcuate ledge.

9. The endgate system of claim 8, wherein the connector of the channel hook is attached to the tailgate between the first end of the cable mechanism and the tailgate axis.

10. The endgate system of claim 9, wherein the channel hook is rotatably attached, such that the arcuate ledge rotates about the connector.

11. A multi-position endgate system, comprising:

a storage box wall;

a storage box floor;

a tailgate mounted relative to the storage box floor and pivotal about a tailgate axis between a fully-closed position proximal to the storage box wall and a fully-open position distal from the storage box wall;

a cable mechanism having a first end pivotally attached to the tailgate and a second end pivotally attached to the storage box wall; and a channel hook having:

a connector attached to the tailgate;

an arcuate ledge spaced from the connector and defining a groove; and an arm joining the arcuate ledge to the connector, wherein the cable mechanism is configured to be passed through the groove of the arcuate ledge to selectively hold the tailgate in an intermediate position between the fully-closed position and the fully-open position, and wherein exit angles of the arcuate ledge are at least tangent with the cable mechanism passing through the groove defined by the arcuate ledge.

12. The endgate system of claim 11, wherein the channel hook further includes:

a clip disposed to selectively block movement of the cable mechanism out of the groove.

13. The endgate system of claim 12, wherein the channel hook is rotatably attached, such that the arcuate ledge rotates about the connector.

14. The endgate system of claim 12, wherein the connector of the channel hook is attached to a slot defined by the tailgate, such that the channel hook translates within the slot.

* * * * *